(12) United States Patent
Tuan

(10) Patent No.: US 9,642,498 B2
(45) Date of Patent: May 9, 2017

(54) HANDLE DEVICE FOR A FOLDABLE ELECTRIC KETTLE

(71) Applicant: Ronald Tuan, Nantou (TW)

(72) Inventor: Ronald Tuan, Nantou (TW)

( * ) Notice: Subject to any disclaimer, the term of this patent is extended or adjusted under 35 U.S.C. 154(b) by 494 days.

(21) Appl. No.: 14/449,182

(22) Filed: Aug. 1, 2014

(65) Prior Publication Data

US 2016/0029848 A1 Feb. 4, 2016

(51) Int. Cl.
*B65D 23/10* (2006.01)
*A47J 45/06* (2006.01)

(52) U.S. Cl.
CPC .................. *A47J 45/065* (2013.01)

(58) Field of Classification Search
CPC ........ A47J 45/065; A47J 45/067; A47J 45/07; A47J 45/075; A47J 45/078
USPC ........ 220/317, 756, 757, 762, 764, 763, 765
See application file for complete search history.

(56) References Cited

U.S. PATENT DOCUMENTS

| 1,546,131 | A | * | 7/1925 | Hechler | ................. | A47J 45/067 220/753 |
| 2,449,129 | A | * | 9/1948 | Kolehmainen | ....... | A47J 27/122 16/425 |
| 8,950,621 | B2 | * | 2/2015 | Hinzman | .............. | A47J 27/002 220/573.1 |

* cited by examiner

*Primary Examiner* — Jeffrey Allen
(74) *Attorney, Agent, or Firm* — Alan D. Kamrath; Kamrath IP Lawfirm, P.A.

(57) ABSTRACT

A handle device for a foldable electric kettle has an inserting mount and a rotating bar. The inserting mount has two connecting arms and a pivot jacket. The pivot jacket is formed on and protrudes from the inserting mount and has a first positioning hole, a rotating recess, a second positioning hole and a mounting recess. The rotating bar is rotatably connected to the inserting mount and has a grip, a switching shaft and a spring. The grip is rotatably inserted in the pivot jacket and has a switching hole and a holding slice. The switching shaft 22 movably mounted in the pivot jacket, is connected to the grip and has a first engaging block, a limiting element, a linking rod, a second engaging block and a pressing button. The spring is mounted in the mounting recess, is mounted around the second engaging block and abuts the pressing button.

12 Claims, 9 Drawing Sheets

HANDLE DEVICE FOR A FOLDABLE ELECTRIC KETTLE

BACKGROUND OF THE INVENTION

1. Field of the Invention

The present invention relates to a handle device, and more particularly to a handle device for a foldable electric kettle that can be adjusted an angle of the handle device relative to the foldable electric kettle according to a user's need.

2. Description of Related Art

A conventional electric kettle has a base, a body, a neck, a spout and a handle. The body is formed on and protrudes form the base. The neck is formed on the body opposite to the base and has a front side and a rear side. The spout is formed through the front side of the neck. The handle is formed on and protrudes from the rear side of the neck. Then, users can carry the conventional electric kettle by the handle and pour liquid out of the conventional electric kettle from the spout.

The conventional electric kettle can be used to store liquid such as water or drink and can be heated by connecting to a heating device. However, the handle of the conventional electric kettle has a fixed structure and cannot be rotated relative to the body of the conventional electric kettle. Then, a user cannot hold the handle with different angle relative to the body of the conventional electric kettle and this will limit the convenience of holding the conventional electric kettle. Furthermore, the fixed structure of the handle will also increase a volume of the conventional electric kettle, and thus the conventional electric kettle requires a larger space for storage when not in use and the fixed structure of the conventional electric kettle is inconvenient for carriage.

To overcome the shortcomings, the present invention provides a handle device for a foldable electric kettle to mitigate or obviate the aforementioned problems.

SUMMARY OF THE INVENTION

The main objective of the present invention is to provide a handle device for a foldable electric kettle that can be adjusted an angle of the handle device relative to the foldable electric kettle according to a user's need.

The handle device for a foldable electric kettle in accordance with the present invention has an inserting mount and a rotating bar. The inserting mount has two connecting arms and a pivot jacket. The pivot jacket is formed on and protrudes from the inserting mount and has a first positioning hole, a rotating recess, a second positioning hole and a mounting recess. The rotating bar is rotatably connected to the inserting mount and has a grip, a switching shaft and a spring. The grip is rotatably inserted in the pivot jacket and has a switching hole and a holding slice. The switching shaft 22 movably mounted in the pivot jacket, is connected to the grip and has a first engaging block, a limiting element, a linking rod, a second engaging block and a pressing button. The spring is mounted in the mounting recess, is mounted around the second engaging block and abuts the pressing button.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
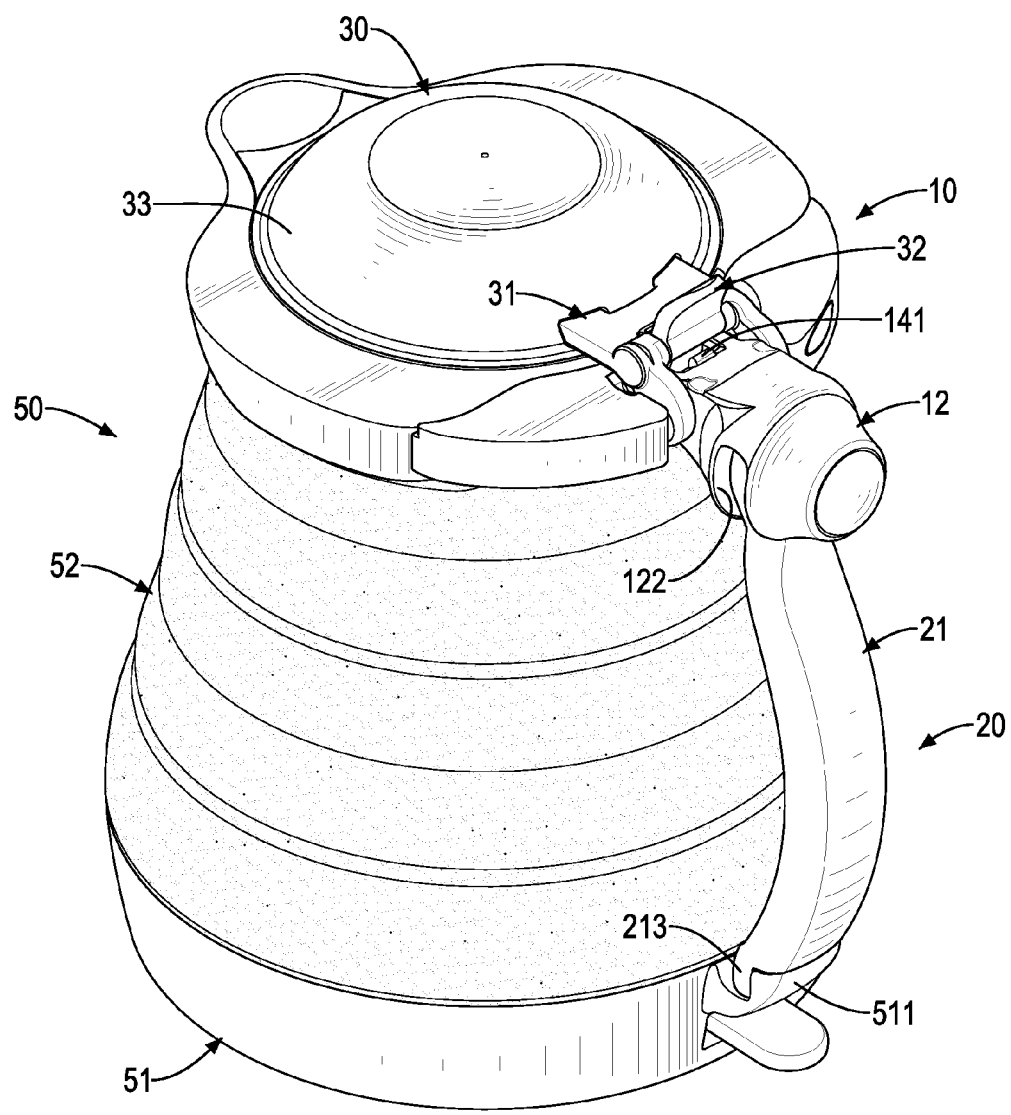
FIG. 1 is a perspective view of a handle device for a foldable electric kettle in accordance with the present invention.
Figure 2:
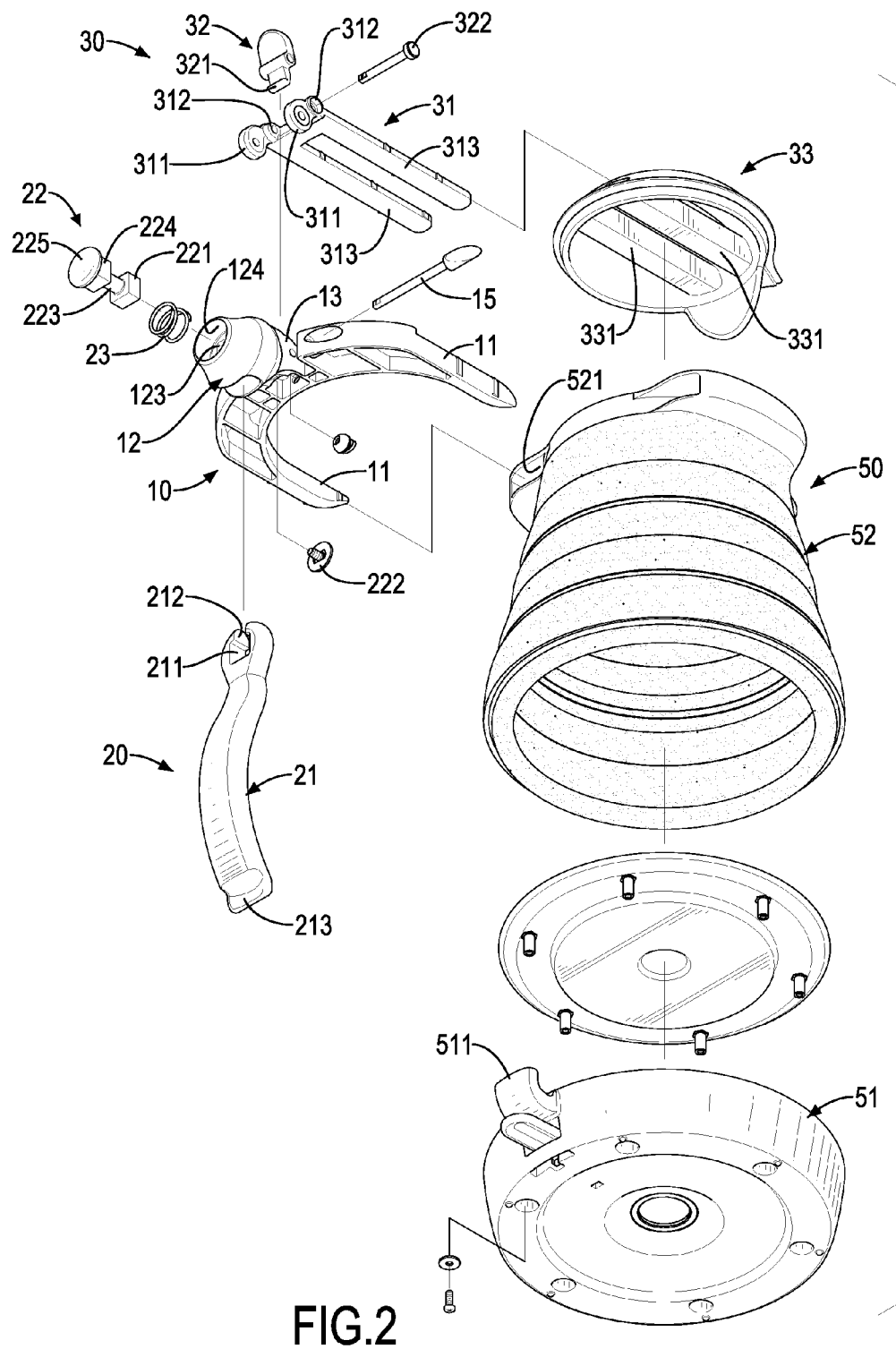
FIG. 2 is an exploded bottom perspective view of the handle device in FIG. 1.
Figure 3:
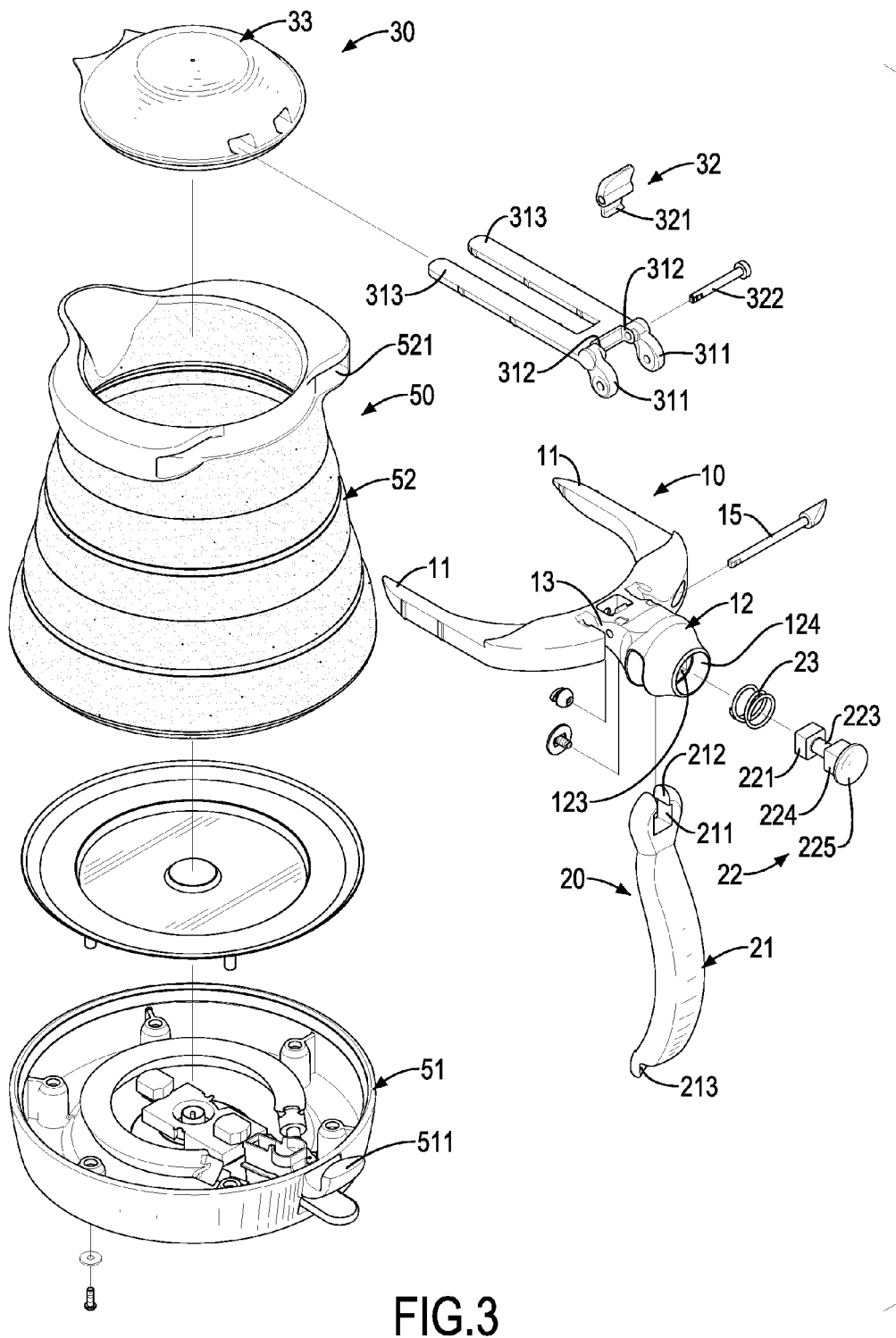
FIG. 3 is an exploded top perspective view of the handle device in FIG. 1.
Figure 4:
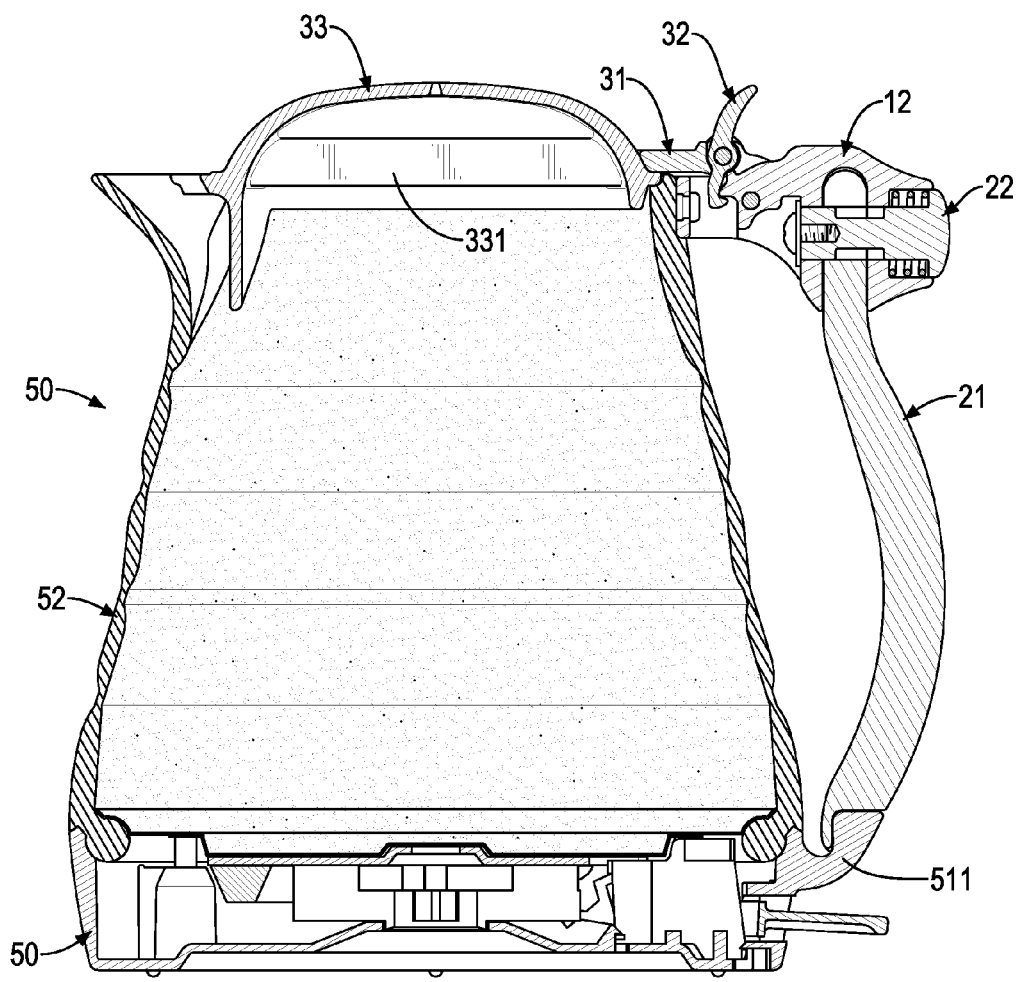
FIG. 4 is a cross sectional side view in partial section of the handle device in FIG. 1.

With reference to FIGS. 1 to 3, a handle device for a foldable electric kettle 50 in accordance with the present invention is detachably connected to the foldable electric kettle 50 and has an inserting mount 10, a rotating bar 20 and a lid 30.

The foldable electric kettle 50 has a base 51 and a folding body 52. The base 51 is a metal basin and has a holding hook 511 formed on and protruding upwardly from an external surface of the base 51. The folding body 52 is made of elastomer such as silica gel as a single piece, is mounted on and connected to the base 51 and has a top, an external surface, an opening and two connecting recesses 512. The opening is formed in the top of the folding body 52. The connecting recesses 512 are formed in the external surface of the folding body 52 beside the opening of the folding body 52 and are parallel to each other.

The inserting mount 10 is U-shaped, is connected to the folding body 52 and has an inner side, an outer side, an internal surface, two connecting arms 11, a pivot jacket 12, two gaps 13, a connecting stem 14 and a pivot rod 15.

The connecting arms 11 are formed on and protrude from the inner side of the inserting mount 10 and are respectively and securely mounted in the connecting recesses 521 of the folding body 52 to enable the internal surface of the inserting mount 10 to abut the external surface of the folding body 52.

Figure 5:
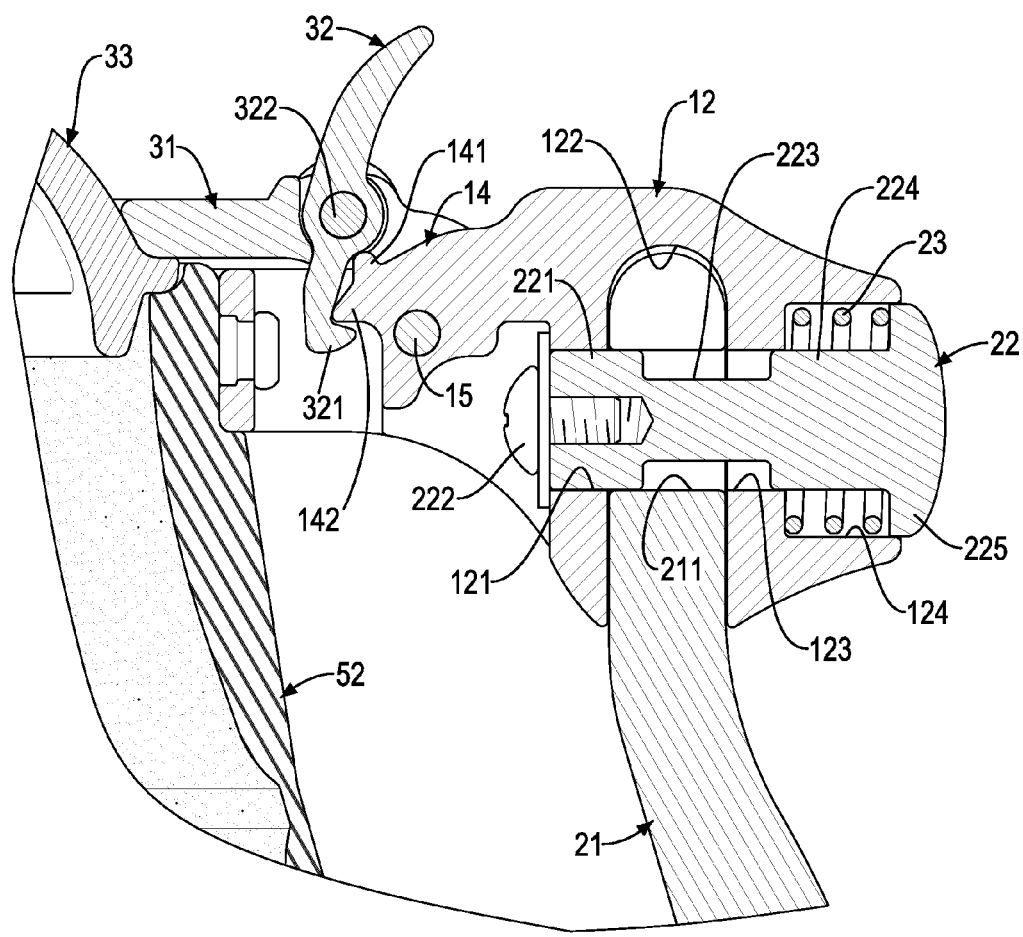
FIG. 5 is an enlarged cross sectional side view in partial section of the handle device in FIG. 4.

With reference to FIGS. 2, 3 and 5, the pivot jacket 12 is hollow, is formed on and protrudes from the outer side of the inserting mount 10 between the connecting arms 11 and has an inner side, an outer side, an external surface, a first positioning hole 121, a rotating recess 122, a second positioning hole 123 and a mounting recess 124. The inner side of the pivot jacket 12 faces the external surface of the folding body 52. The first positioning hole 121 may be polygonal and is formed through the inner side of the pivot jacket 12. The rotating recess 122 is formed in the pivot jacket 12, is partially formed through the external surface of the pivot jacket 12 and communicates with the first positioning hole 121. The second positioning hole 123 may be polygonal, is formed in the pivot jacket 12 opposite to the first positioning hole 121 and communicates with the rotating recess 122. Preferably, the positioning holes 121, 123 are square. The mounting recess 124 is formed through the outer side of the pivot jacket 12, communicates with the second positioning hole 123 and has an inner diameter larger than an inner diameter of the second positioning hole 123.

The gaps 13 are formed through the inserting mount 10 between the connecting arms 11 and the pivot jacket 12. The connecting stem 14 is formed on and protrudes from the inner side of the pivot jacket 12 and has a top, an inner end, an abutting block 141 and an engaging hook 142. The abutting block 141 is formed on and protrudes upwardly from the top of the connecting stem 14. The engaging hook 142 is formed on and protrudes from the inner end of the connecting stem 14 below the abutting block 141. The pivot rod 15 is mounted between the connecting stem 14 and the connecting arms 11 via the gaps 13.

The rotating bar 20 is rotatably connected to the inserting mount 10 and has a grip 21, a switching shaft 22 and a spring 23.

The grip 21 is curved, is rotatably inserted in the pivot jacket 12 via the rotating recess 122 and has a top end, a bottom end, a switching hole 211, an assembling hole 212 and a holding slice 213. The top end of the grip 21 is mounted in the pivot jacket 12 via the rotating recess 122. The switching hole 211 is formed through the grip 21 near the top end of the grip 21, is mounted in the rotating recess 122 and communicates with the first positioning hole 121 and the second positioning hole 122. Preferably, the switching hole 211 has a shape corresponding to the shapes of the positioning holes 121, 123. The assembling hole 212 is formed through the top of the grip 21 and communicates with the switching hole 211. The holding slice 213 is formed on the bottom end of the grip 21 and selectively engages the holding hook 511 of the base 51.

With further reference to FIGS. 2 and 5, the switching shaft 22 is movably mounted in the pivot jacket 12, is connected to the grip 21 and has a fixing end, a pressing end, a first engaging block 221, a limiting element 222, a linking rod 223, a second engaging block 224 and a pressing button 225. The fixing end of the switching shaft 22 extends out of the inner side of the pivot jacket 12 via the first positioning hole 121. The first engaging block 221 is formed on the fixing end of the switching shaft 22 and is movably mounted between the first positioning hole 121 of the pivot jacket 12 and the switching hole 211 of the grip 21. Preferably, the first engaging block 221 has a shape corresponding to the shape of the first positioning hole 121.

The limiting element 222 is securely mounted on the fixing end of the switching shaft 22, selectively abuts the inner side of the pivot jacket 12 below the connecting stem 14 and is connected to the first engaging block 221 to prevent the fixing end of the switching shaft 22 from moving into the pivot jacket 12. The linking rod 223 is formed on the first engaging block 221 opposite to the limiting element 222, is mounted in the pivot jacket 12 between the switching hole 211 of the grip 21 and the second positioning hole 123 of the pivot jacket 12 and has an outer diameter smaller than the diameters of the switching hole 211, the second positioning holes 123 and the assembling hole 212.

The second engaging block 224 is formed on the linking rod 223 opposite to the first engaging block 221, is mounted in the pivot jacket 12 between the second positioning hole 123 and the mounting recess 124 and has a shape corresponding to the shape of the second positioning hole 123 of the pivot jacket 12. The pressing button 225 is formed on the second engaging block 224 opposite to the linking rod 223, is mounted above the mounting recess 124 and has an outer diameter as large as an inner diameter of the mounting recess 124 to enable the pressing button 225 to move into the mounting recess 124.

The spring 23 is mounted in the mounting recess 124 of the pivot jacket 12, is mounted around the second engaging block 224 and abuts the pressing button 225 to enable the first engaging block 221 to engage the pivot jacket 12 and the grip 21 between the first positioning hole 121 and the switching hole 211 and to enable the second engaging block 224 to engage the pivot jacket 12 between the second positioning hole 123 and the mounting recess 124. Then, the engagements between the engaging blocks 221, 224, the pivot jacket 12 and the grip 21 can enable the grip 21 to connect securely between the pivot jacket 12 of the inserting mount 10 and the holding hook 511 of the base 51 without rotating relative to the folding body 52.

The lid 30 is connected to the rotating bar 20 to lid the opening of the folding body 52 and has a pivot frame 31, a pressing board 32 and a covering panel 33.

The pivot frame 31 is U-shaped, is rotatably connected to the inserting mount 10 and has an inserting end, a pivot end, two pivot wings 311, two board wings 312 and two inserting stems 313. The inserting end of the pivot frame 31 is mounted above the inserting mount 10. The pivot end of the pivot frame 31 is mounted above the gaps 13 of the inserting mount 10. The pivot wings 311 are formed on and protrude downwardly from the pivot end of the pivot frame 31 and are respectively mounted in the gaps 13 of the inserting mount 10 between the connecting arms 11 and the pivot jacket 12. In addition, the pivot rod 15 is mounted through the pivot wings 311 to pivotally connect the pivot frame 31 with the inserting mount 10. The boards wings 312 are formed on and protrude upwardly from the pivot frame 31 above the pivot wings 311. The inserting stems 313 are formed on and protrude from the inserting end of the pivot frame 31, are parallel with each other and extend above the opening of the folding body 52.

The pressing board 32 is rotatably connected to the pivot frame 31, abuts the pivot frame 31 and the abutting block 141 of the connecting stem 14 and has a lower end, an upper end, a positioning hook 321 and a pivotal pin 322. The lower end of the pressing board 32 extends downwardly below the board wings 312. The upper end of the pressing board 32 extends upwardly out of the pivot frame 31. The positioning hook 321 is formed on the lower end of the pressing board 32 and selectively engages the engaging hook 142 of the connecting stem 14. The pivotal pin 322 is mounted through the board wings 312 and the pressing board 32 to rotatably connect the pressing board 32 with the pivot frame 31.

The covering panel 33 is connected to the pivot frame 31 above the opening of the folding body 52 and has an external surface and two mounting tubes 331. The mounting tubes 331 are formed in the covering panel 33 above the opening of the folding body 52 and are parallel with each other. Each one of the mounting tubes 331 has an opening end formed through the external surface of the covering panel 33 to enable the mounting tube 33 to mount around one of the inserting stems 313 of the pivot frame 31. Then, the covering panel 33 is connected to the pivot frame 31 above the opening of the folding body 52.

Figure 6:
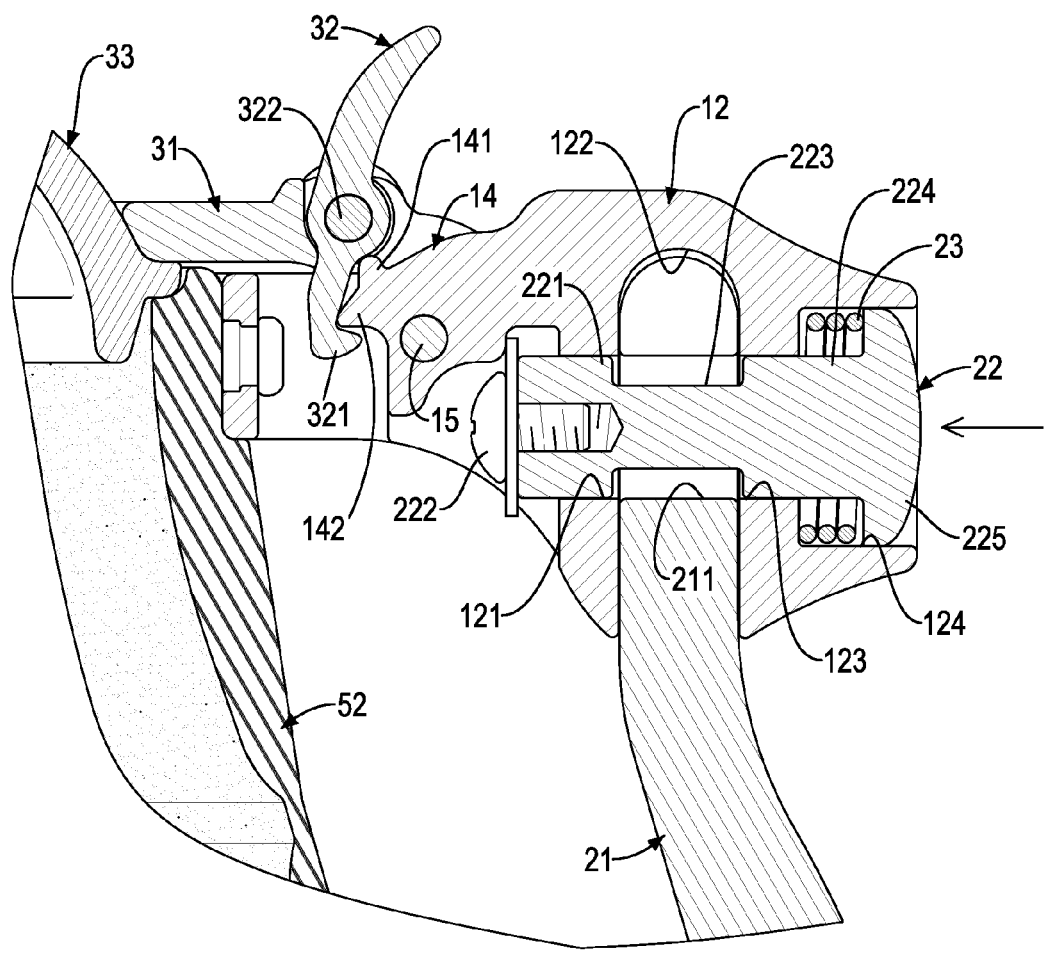
FIG. 6 is an enlarged operational side view of the handle device in FIG. 5.
Figure 7:
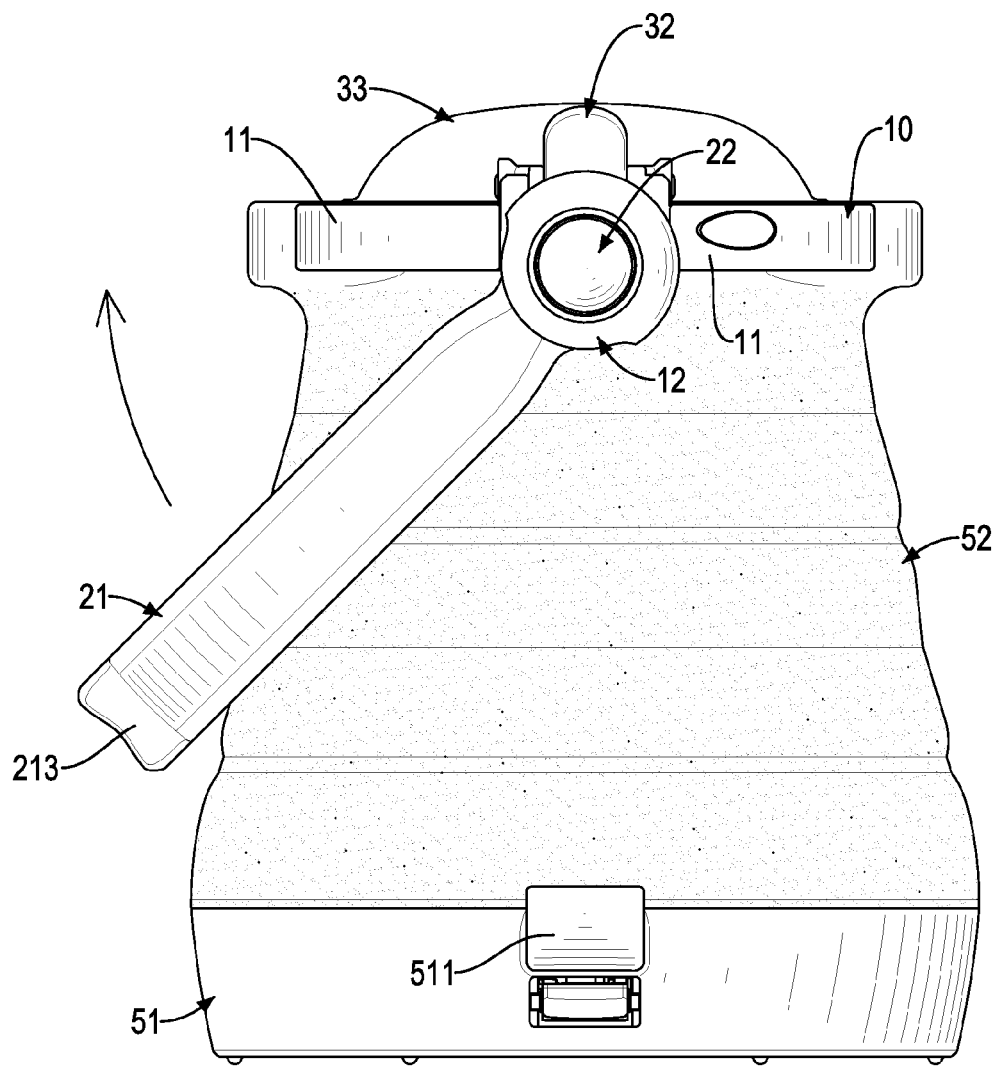
FIG. 7 is an operational side view of the handle device in FIG. 1.
Figure 8:
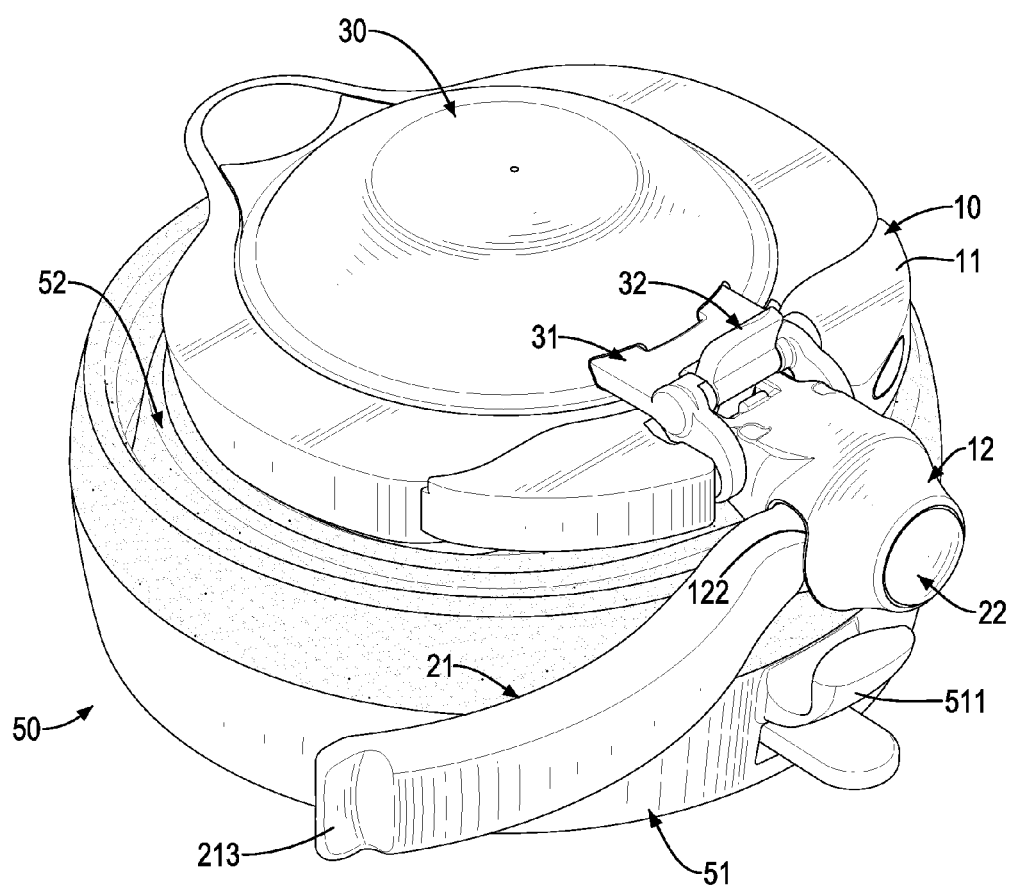
FIG. 8 is an operational perspective view of the handle device with the foldable electric kettle in FIG. 1, shown in a folded condition.

In use, with reference to FIGS. 5 and 6, when the rotating bar 20 needs to rotate relative to the inserting mount 10 and the folding body 52 of the foldable electric kettle 50, the pressing button 225 is pressed to move into the mounting recess 124 to compress the spring 23 and enable the switching shaft 22 to move toward the connecting arms 11 of the inserting mount 10. With the movement of the pressing button 225 relative to the pivot jacket 12, the linking rod 223 moves to the switching hole 211 of the grip 21 and the first engaging block 221 moves away from the switching hole 211 and extends out of the inner side of the pivot jacket 12. Then, the limiting element 22 is moved with the first engaging block 221 to separate from the inner side of the pivot jacket 12. At this time, due to the first engaging block 221 disengage from the switching hole 211 of the grip 21 and the outer diameter of the linking rod 223 is smaller than the inner diameter of the switching hole 211, the grip 21 can be rotated relative to the inserting mount 10 as shown in FIG. 7 to enable the holding slice 213 to disengage from the holding hook 511 of the base 51.

After adjusting the angle of the rotating bar 20 relative to the inserting mount 10, the user only needs to release the pressing button 225 of the switching shaft 22, the compressed spring 23 will provide an elastic force to the pressing button 225 to move the switching shaft 22 back to the original position relative to the pivot jacket 12 and the grip 21. Then, the first engaging block 221 engages between the first positioning hole 121 and the switching hole 211 to hold the grip 21 securely with the pivot jacket 12.

Figure 9:
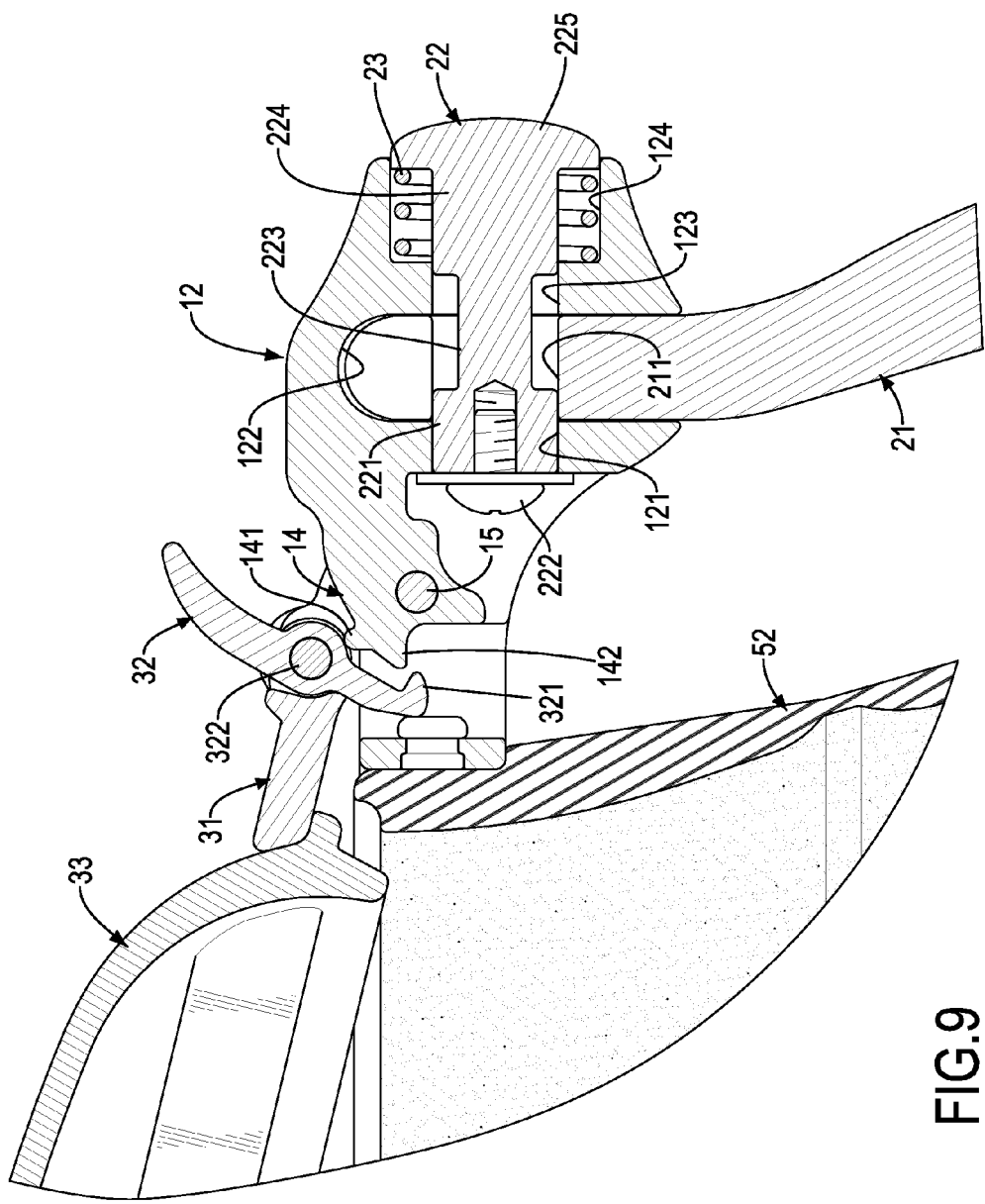
FIG. 9 is another enlarged operational side view of the handle device in FIG. 5.

Furthermore, with reference to FIG. 9, when the holding slice 213 of the grip 21 disengages from the holding hook 511 of the base 51, the foldable electric kettle 50 can be folded by pressing the opening of the folding body 52 to enable the folding body 52 to fold in the base 51 to reduce the volume of the foldable electric kettle, and this is convenient for carriage and storage. In addition, when the user presses the pressing button 225 as shown in FIG. 6, the grip 21 can be moved relative to the linking rod 223 to separate from the switching shaft 22 by the assembling hole 212, and this can enable the grip 21 to separate from the pivot jacket 12 of the inserting mount 10. In assembly, the user can press the pressing button 225 to move the linking rod 223 in the rotating recess 122, and the grip 21 can insert into the pivot jacket 12 via the rotating recess 122 and can mount around the linking rod 223 via the assembling hole 212. After assembling the grip 21 with the switching shaft 22 and the pivot jacket 12, the user can release the pressing button 225 to enable the first engaging block 221 to engage the pivot jacket 12 and the grip 21. Then, the grip 21 can be securely connected with the pivot jacket 12.

With reference to FIG. 9, when the user wants to open the lid 30 relative to the folding body 52, the user can press the upper end of the pressing board 32 to enable the upper end of the pressing board 32 to move toward the connecting stem 14, the positioning hook 321 will disengage from the engaging block 142. Then, the pressing board 32 can abut and push the pivot frame 31 to rotate to separate from the folding body 52 and the lid 33 that is connected to the pivot frame can separate from the opening of the folding body 52. When the user releases the pressing board 32, the weight of the lid 33 can press and move the pressing board 32 back the original position via the pivot frame 31 and this also can enable the positioning hook 321 to engage the engaging hook 142.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A handle device for a foldable electric kettle having a base with a holding hook formed on and protruding upwardly from an external surface of the base and a folding body being made of elastomer, connected to the base with a top, an external surface, an opening formed in the top of the folding body and two connecting recesses formed in the external surface of the folding body beside the opening of the folding body and parallel to each other, and the handle device comprising:

an inserting mount being U-shaped, being adapted to connect to the folding body and having
an inner side;
an outer side;
an internal surface;
two connecting arms formed on and protruding from the inner side of the inserting mount to respectively mount in the connecting recesses of the folding body to enable the internal surface of the inserting mount to abut the external surface of the folding body; and
a pivot jacket being hollow, formed on and protruding from the outer side of the inserting mount between the connecting arms and having
an inner side facing the external surface of the folding body;
an outer side;
an external surface;
a first positioning hole formed through the inner side of the pivot jacket;
a rotating recess formed in the pivot jacket, partially formed through the external surface of the pivot jacket and communicating with the first positioning hole;
a second positioning hole formed in the pivot jacket opposite to the first positioning hole and communicating with the rotating recess; and
a mounting recess formed through the outer side of the pivot jacket, communicating with the second positioning hole and having an inner diameter larger than an inner diameter of the second positioning hole; and
a rotating bar rotatably connected to the inserting mount and having
a grip rotatably inserted in the pivot jacket via the rotating recess and having
a top end mounted in the pivot jacket via the rotating recess;
a bottom end;
a switching hole formed through the grip near the top end of the grip, mounted in the rotating recess and communicating with the first positioning hole and the second positioning hole; and
a holding slice formed on the bottom end of the grip to selectively engage the holding hook of the base;
a switching shaft movably mounted in the pivot jacket, connected to the grip and having
a fixing end extending out of the inner side of the pivot jacket via the first positioning hole;
a pressing end;
a first engaging block formed on the fixing end of the switching shaft and movably mounted between the first positioning hole of the pivot jacket and the switching hole of the grip;
a limiting element securely mounted on the fixing end of the switching shaft, selectively abutting the inner side of the pivot jacket and connected to the first engaging block to prevent the fixing end of the switching shaft from moving into the pivot jacket;
a linking rod formed on the first engaging block opposite to the limiting element, mounted in the pivot jacket between the switching hole of the grip and the second positioning hole of the pivot jacket and having an outer diameter smaller than diameters of the switching hole and the second positioning holes;
    a second engaging block formed on the linking rod opposite to the first engaging block and mounted in the pivot jacket between the second positioning hole and the mounting recess; and
    a pressing button formed on the second engaging block opposite to the linking rod and mounted above the mounting recess; and
  a spring mounted in the mounting recess of the pivot jacket, mounted around the second engaging block and abutting the pressing button to enable the first engaging block to engage the pivot jacket and the grip between the first positioning hole and the switching hole and to enable the second engaging block to engage the pivot jacket between the second positioning hole and the mounting recess.

2. The handle device as claimed in claim 1, wherein the inserting mount has
  two gaps formed through the inserting mount between the connecting arms and the pivot jacket;
  a pivot rod mounted between the connecting arms via the gaps;
the handle device has a lid connected to the rotating bar to lid the opening of the folding body and having
  a pivot frame being U-shaped, rotatably connected to the inserting mount and having
    an inserting end mounted above the inserting mount;
    a pivot end mounted above the gaps of the inserting mount; and
    two pivot wings formed on and protruding downwardly from the pivot end of the pivot frame and respectively mounted in the gaps of the inserting mount between the connecting arms and the pivot jacket to enable the pivot rod to mount through the pivot wings to pivotally connect the pivot frame with the inserting mount.

3. The handle device as claimed in claim 2, wherein the inserting mount has a connecting stem formed on and protruding from the inner side of the pivot jacket, connected to the pivot rod and having
  a top;
  an inner end;
  an abutting block formed on and protruding upwardly from the top of the connecting stem; and
  an engaging hook formed on and protruding from the inner end of the connecting stem below the abutting block;
the pivot frame has two boards wings formed on and protruding upwardly from the pivot frame above the pivot wings; and
the lid has a pressing board rotatably connected to the pivot frame, abutting the pivot frame and the abutting block of the connecting stem and having
  a lower end extending downwardly below the board wings;
  an upper end extending upwardly out of the pivot frame;
  a positioning hook formed on the lower end of the pressing board and selectively engaging the engaging hook of the connecting stem; and
  a pivotal pin mounted through the board wings and the pressing board to rotatably connect the pressing board with the pivot frame.

4. The handle device as claimed in claim 2, wherein
the pivot frame has two inserting stems formed on and protruding from the inserting end of the pivot frame to extend above the opening of the folding body and parallel with each other; and
the lid has a covering panel connected to the pivot frame above the opening of the folding body and having
  an external surface; and
  two mounting tubes formed in the covering panel above the opening of the folding body parallel with each other, and each one of the mounting tubes having an opening end formed through the external surface of the covering panel to enable the mounting tube to mount around one of the inserting stems of the pivot frame.

5. The handle device as claimed in claim 3, wherein
the pivot frame has two inserting stems formed on and protruding from the inserting end of the pivot frame to extend above the opening of the folding body and parallel with each other; and
the lid has a covering panel connected to the pivot frame above the opening of the folding body and having
  an external surface; and
  two mounting tubes formed in the covering panel above the opening of the folding body parallel with each other, and each one of the mounting tubes having an opening end formed through the external surface of the covering panel to enable the mounting tube to mount around one of the inserting stems of the pivot frame.

6. The handle device as claimed in claim 4, wherein the grip has an assembling hole formed through the top of the grip and communicating with the switching hole and having an inner diameter larger than the outer diameter of the linking rod.

7. The handle device as claimed in claim 5, wherein the grip has an assembling hole formed through the top of the grip and communicating with the switching hole and having an inner diameter larger than the outer diameter of the linking rod.

8. The handle device as claimed in claim 6, wherein
each one of the positioning holes and the switching hole is polygonal; and
the engaging blocks have shapes corresponding to the shapes of the positioning holes and the switching hole.

9. The handle device as claimed in claim 7, wherein
each one of the positioning holes and the switching hole is polygonal; and
the engaging blocks have shapes corresponding to the shapes of the positioning holes and the switching hole.

10. The handle device as claimed in claim 1, wherein the grip has an assembling hole formed through the top of the grip and communicating with the switching hole and having an inner diameter larger than the outer diameter of the linking rod.

11. The handle device as claimed in claim 2, wherein the grip has an assembling hole formed through the top of the grip and communicating with the switching hole and having an inner diameter larger than the outer diameter of the linking rod.

12. The handle device as claimed in claim 3, wherein the grip has an assembling hole formed through the top of the grip and communicating with the switching hole and having an inner diameter larger than the outer diameter of the linking rod.

* * * * *